Patented Dec. 15, 1936

2,063,953

UNITED STATES PATENT OFFICE 2,063,953

GLAZED CERAMIC WARE AND METHOD OF MAKING

Gordon R. Pole, Florence, Ala., assignor to Tennessee Valley Authority, Wilson Dam, Ala., a corporation of the United States No Drawing. Application February 27, 1936, Serial No. 66,063

9 Claims. (Cl. 25—157)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a new glazed ceramic ware and a process for making the same.

One of the objects of this invention is to provide a ceramic ware with an improved finish. Another object of this invention is to produce an improved vapor glaze on ceramic ware. Other objects of this invention include the provision for a means for glazing ceramic ware that is difficult to glaze by the ordinary salt glazing method.

Ceramic ware, such as brick, sewer pipe, stoneware, telephone conduit, and tile, is ordinarly vapor glazed by contacting the ware, heated to glazing temperature, with a gaseous mixture carrying vaporized sodium chloride. The quality of the glaze obtained depends largely on the composition of the molded ware with all other conditions being favorable. Compositions which are high in silica yield a satisfactory glaze with sodium chloride, while those compositions which consist of clay only, or which are comprised of high lime or high alumina content, yield correspondingly poor glazes.

I have discovered a new article of manufacture consisting of a ceramic ware which has been glazed with phosphorus pentoxide and a method for making the same by contacting the ceramic ware, either unglazed or previously salt glazed, with a gaseous mixture containing phosphorus pentoxide, while maintaining the same at a glazing temperature.

One example of the operation of my process and the product resulting is given with a variety of raw materials and compared with the usual processes of salt glazing and the product obtained thereby:

Four ceramic bodies of the following compositions were made into the test pieces, Body No. 1   Clay only     56% $SiO_2$   37% $Al_2O_3$
Body No. 2   High silica   68.5% $SiO_2$   26% $Al_2O_3$
Body No. 3   High lime    4% $CaO$
Body No. 4   High alumina   49% $Al_2O_3$ These four ceramic bodies were vapor glazed at Cone No. 6 (1230° C. approximately) by the following methods:

Run No. 1. Glazed by regular salt glazing method.

Run No. 2. Glazed by burning yellow phosphorus in kiln.

Run No. 3. Glazed by volatilizing phosphorus pentoxide in kiln.

Run No. 4. Glazed by alternate salt glazing and burning yellow phosphorus in kiln.

The test pieces were examined for the brightness and thickness of the glaze produced with the following results:

*Run No. 1.—Glazed by regular salt glazing method*

| Ceramic body | Description of glaze |
| --- | --- |
| Clay only | Bright, thin glaze |
| High silica, 68.5% | Bright, thick glaze |
| High lime, 4% | Dull, thin glaze |
| High alumina, 49% | Dull, very little glaze |

*Run No. 2.—Glazed by burning yellow phosphorus in kiln*

| Ceramic body | Description of glaze |
| --- | --- |
| Clay only | Bright, thin glaze |
| High silica, 68.5% | Bright, thin glaze |
| High lime, 4% | Bright, thin glaze |
| High alumina, 49% | Dull, thin glaze |

*Run No. 3.—Glazed by volatilizing phosphorus pentoxide in kiln*

| Ceramic body | Description of glaze |
| --- | --- |
| Clay only | Dull, thin glaze |
| High silica, 68.5% | Dull, thin glaze |
| High lime, 4% | Dull, thin glaze |
| High alumina, 49% | Dull, thin glaze |

*Run No. 4.—Glazed by alternate salt glazing and burning yellow phosphorus in kiln*

| Ceramic body | Description of glaze |
| --- | --- |
| Clay only | Bright, thick glaze |
| High silica, 68.5% | Bright, thick glaze |
| High lime, 4% | Bright, thick glaze |
| High alumina, 49% | Bright, thick glaze |

It is evident that there are numerous factors which will influence conditions for the most satisfactory operation of my invention, the actual limits of which cannot be established except by a detailed study of each set of raw materials and the intermediate and finished products involved. Even though glazing with phosphorus pentoxide may improve the glaze on those wares which may be satisfactorily glazed by the usual methods, using ordinary salt, sodium chloride, it is preferred to use the phosphorus pentoxide in the glazing of those wares which are difficult, or practically impossible to glaze, by the use of ordinary salt, such as wares which have a high lime or high alumina content. Such wares may be glazed by the use of phosphorus pentoxide alone or after a preliminary salt glaze produced in the usual manner. In some instances the phosphorus pentoxide glazing may be followed by a final salt glazing.

The gaseous mixture containing phosphorus pentoxide and suitable for glazing with the material may be obtained by any convenient means, such as, by the partial or total oxidation of phosphate reduction furnace gas, by the oxidation of elemental phosphorus or by the volatilization of phosphorus pentoxide. The amount of the phosphorus pentoxide required will depend upon the composition and the surface of the ware to be glazed. The operation of a 30 foot down-draft sewer pipe kiln given below will serve to further indicate the method of operation and the amounts of glazing materials required. One round of salt means 60 to 100 lbs. of sodium chloride, distributed equally to each fire box and one round of phosphorus pentoxide means 25 to 100 lbs. of phosphorus pentoxide, or its equivalent, distributed equally to each fire box. The ware to be glazed is placed in the kiln, brought to the proper temperature for salt glazing and contacted with a gaseous mixture containing the active glazing agent in any one of the sequences outlined as follows:

1. One or more rounds of phosphorus pentoxide.
2. One or more rounds of phosphorus pentoxide, and one or more rounds of sodium chloride.
3. One or more rounds of sodium chloride, and one or more rounds of phosphorus pentoxide.
4. One or more rounds of sodium chloride, one or more rounds of phosphorus pentoxide and one or more rounds of sodium chloride.

The kiln is operated throughout in substantially the same manner currently used in the salt glazing operation and after the final glazing operation the kiln is cooled in the usual manner.

It will be seen, therefore, that this invention actually may be carried out by the modification of certain details without departing from its spirit or scope.

I claim:
1. Process for making glazed ceramic ware, which comprises, burning a phosphate reduction furnace gas to form a gaseous mixture containing phosphorus pentoxide, and contacting a glazed ceramic ware with the gaseous mixture containing phosphorus pentoxide, while maintaining the ware at a glazing temperature.

2. Process for making glazed ceramic ware, which comprises, burning elemental phosphorus to form a gaseous mixture containing phosphorus pentoxide, and contacting an unglazed ceramic ware with the gaseous mixture containing phosphorus pentoxide, while maintaining the ware at a glazing temperature.

3. Process for making glazed ceramic ware, which comprises, contacting an unglazed ceramic ware with a gaseous mixture containing sodium chloride, while maintaining the ware at a glazing temperature; and contacting the salt glazed ceramic ware with a gaseous mixture containing phosphorus pentoxide, while maintaining the ware at a glazing temperature.

4. Process for making glazed ceramic ware, which comprises, contacting an unglazed ceramic ware with a gaseous mixture containing sodium chloride, while maintaining the ware at a glazing temperature; contacting the salt glazed ceramic ware with a gaseous mixture containing phosphorus pentoxide, while maintaining the ware at a glazing temperature; and contacting the phosphorus pentoxide glazed ceramic ware with a gaseous mixture containing sodium chloride, while maintaining the same at a glazing temperature.

5. Process for making glazed ceramic ware, which comprises, contacting a glazed ceramic ware with a gaseous mixture containing phosphorus pentoxide, while maintaining the ware at a glazing temperature.

6. Process for making glazed ceramic ware, which comprises, contacting a ceramic ware with a gaseous mixture containing phosphorus pentoxide, while maintaining the ware at a glazing temperature.

7. A glazed ceramic ware, consisting of, an unglazed ceramic ware which has been glazed with salt and phosphorus pentoxide.

8. A glazed ceramic ware, consisting of, a glazed ceramic ware which has been finally glazed with phosphorus pentoxide.

9. A glazed ceramic ware, consisting of, a ceramic ware which has been glazed with phosphorus pentoxide.

GORDON R. POLE.